C. D. PETTIS.
BRAKE SHOE.
APPLICATION FILED OCT. 25, 1912.
1,065,719.
Patented June 24, 1913.
3 SHEETS—SHEET 1.
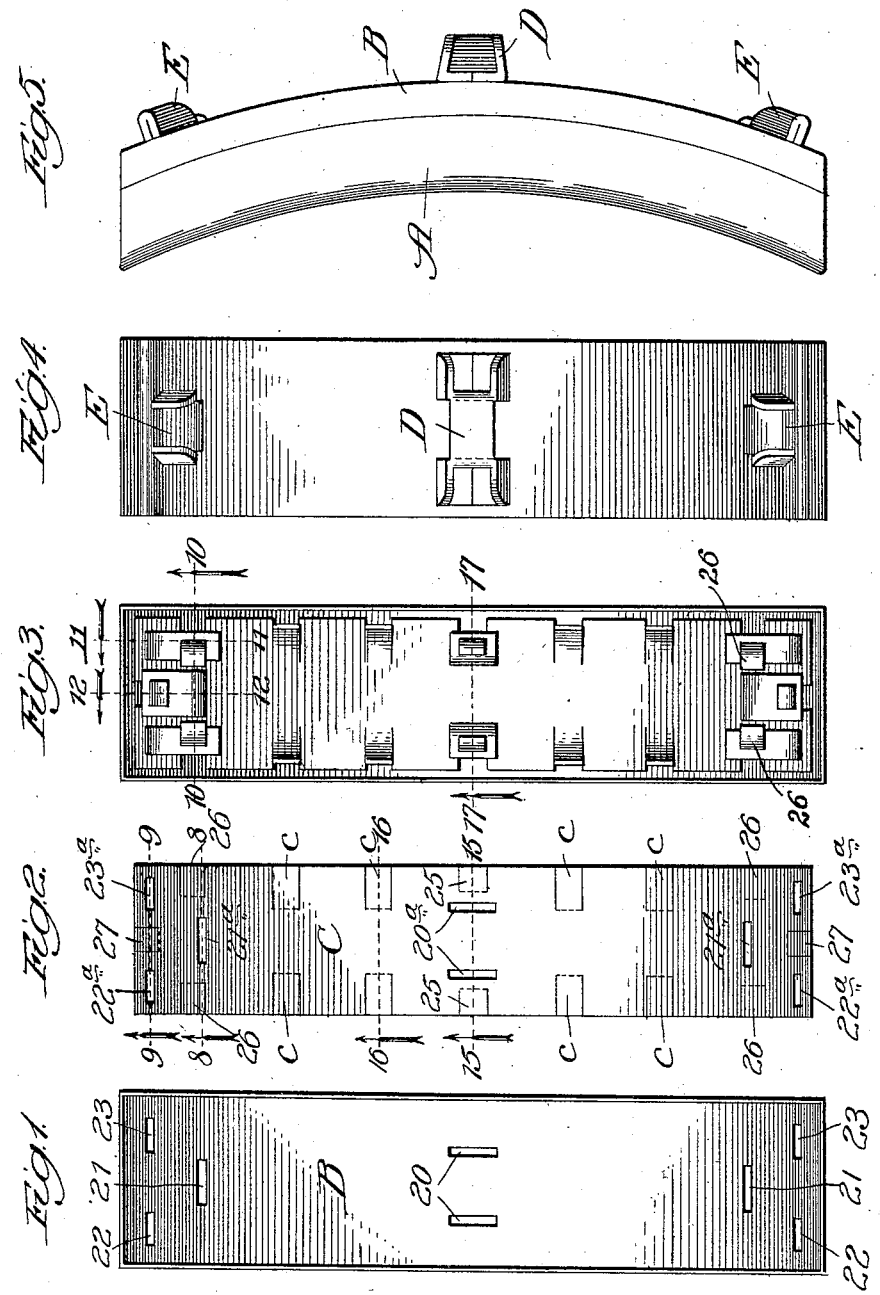

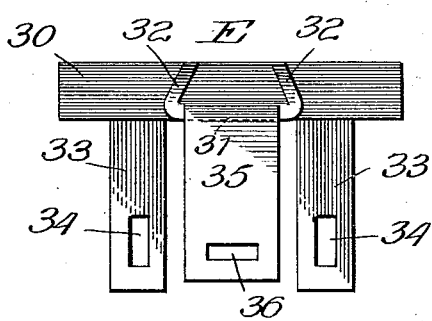
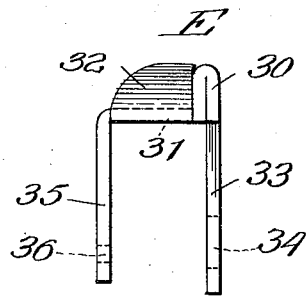
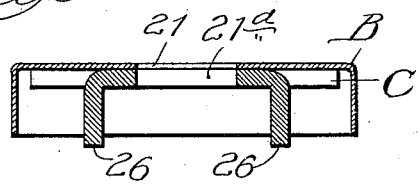
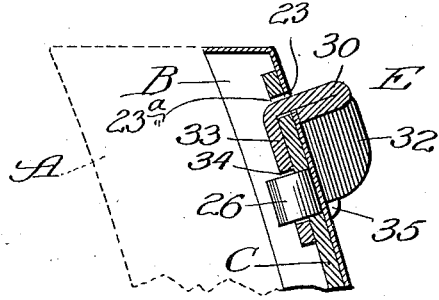
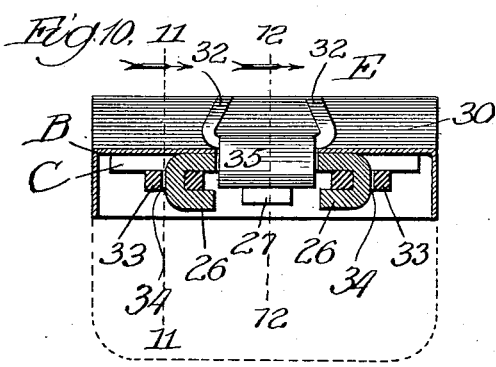
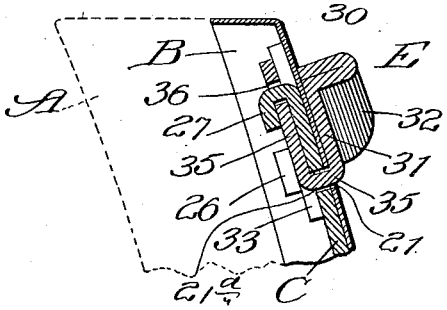

C. D. PETTIS.
BRAKE SHOE.
APPLICATION FILED OCT. 25, 1912.
1,065,719.
Patented June 24, 1913.
3 SHEETS—SHEET 3.
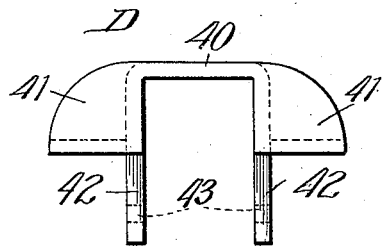
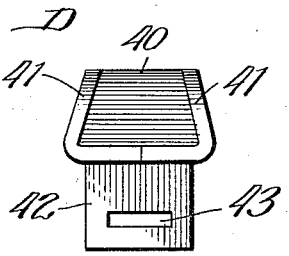
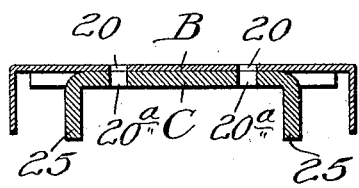
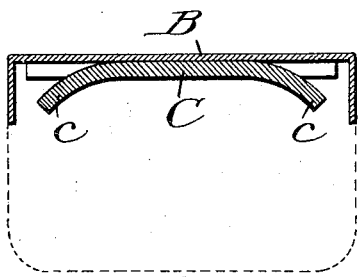
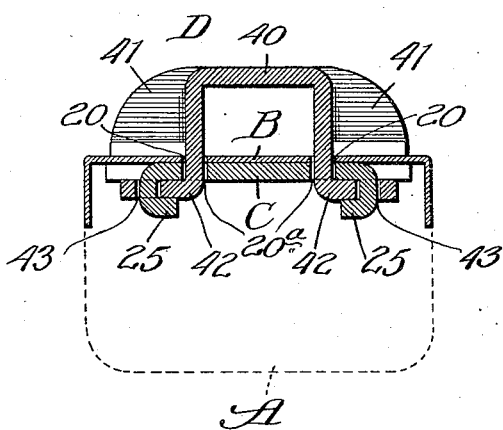
Witnesses:
Inventor:
Clifton D. Pettis
By Pierre Fisher & Clapp
Attys

UNITED STATES PATENT OFFICE.

CLIFTON D. PETTIS, OF CHICAGO, ILLINOIS.

BRAKE-SHOE.

1,065,719.    Specification of Letters Patent.    Patented June 24, 1913.

Application filed October 25, 1912. Serial No. 727,807.

*To all whom it may concern:*

Be it known that I, CLIFTON D. PETTIS, a citizen of the United States, and a resident of the city of Chicago, county of Cook, and State of Illinois, have invented certain new and useful Improvements in Brake-Shoes, of which I do declare the following to be a full, clear, and exact description, reference being being had to the accompanying drawings, forming part of this specification.

My present invention has relation to that class of brake shoes for railway cars commonly known as reinforced brake shoes, in which provision is made for strengthening the back of the shoe and its attaching lugs, and the invention consists in the features of improvement hereinafter described, illustrated in the drawings and particularly pointed out in the claims at the end of this specification.

In an application filed by me in the United States Patent Office under date of August 3, 1912, Serial No. 713,175, I have shown and claimed a construction of reinforced brake shoe in which there is provided a back of thin metal and a supplemental reinforcing member of thicker metal, these parts being connected together by the lugs whereby the brake shoe will be attached to the brake head. In the present application I have shown the invention sought to be covered hereby as applied to the construction of shoe illustrated in said application Serial No. 713,175, but I wish it distinctly understood that the invention is susceptible of wider application and I also wish it understood that it is not intended in the present application to cover matters illustrated and claimed in said application Serial No. 713,175.

Referring to the accompanying drawings: Figure 1 is an inner face view of the thin ductile metal back or shell that incloses the back portion of my improved shoe. Fig. 2 is an inner face view of a reinforcing back plate or supplemental back plate to set within the back or shell. Fig. 3 is an inner face view of the back or shell with the supplemental back plate locked thereto by means of the center and end lugs of the shoe. Fig. 4 is a view in front elevation and Fig. 5 is a view in side elevation of the completed shoe. Fig. 6 is a detail view (upon an enlarged scale) of one of the end lugs before it is attached in position for use. Fig. 7 is a detail view of the end lug shown in Fig. 6. Figs. 8 and 9 are views in cross section upon an enlarged scale, taken respectively on lines 8—8 and 9—9 of Fig. 2. Fig. 10 is a similar view in cross section on line 10—10 of Fig. 3. Fig. 11 is a view in vertical longitudinal section on line 11—11 of Fig. 10. Fig. 12 is a similar view in vertical longitudinal section on line 12—12 of Fig. 10. Fig. 13 is a detail view in front elevation of the center lug of the shoe. Fig. 14 is a detail end view of the center lug of the shoe. Figs. 15 and 16 are views upon an enlarged scale in cross section on lines 15—15 and 16—16 respectively of Fig. 2. Fig. 17 is a similar view in cross section on line 17—17 of Fig. 3.

A designates the body of the brake shoe that in the preferred form of my invention is formed of cast iron, and B denotes a ductile metal pan-shaped back or shell that is connected to the body A of the shoe in the casting operation. Within the shell or back B is arranged a supplemental reinforcing back preferably in the form of a plate C, and D and E denote, respectively, the center and end lugs of the shoe. In this form of my invention, as in that set forth in my above mentioned application Serial No. 713,175, the pan-shaped back B is provided with perforations and the supplemental back C, arranged within this pan-shaped back B, is provided with perforations adapted to come coincident with the perforations of the back B, these perforations serving to permit the passage therethrough of the projecting parts or members of the center and end lugs D and E, whereby the back B and supplemental back C are locked together prior to the operation of casting the body of the shoe.

As shown, the back B is formed adjacent its center with slots or perforations 20 and adjacent its ends with slots or perforations 21, 22 and 23 and, similarly, the supplemental back C is provided adjacent its center with slots 20ᵃ and adjacent its ends with slots 21ᵃ, 22ᵃ and 23ᵃ, these several slots of the supplemental back C being adapted to coincide with the corresponding slots of the back B. The supplemental back C is shown as formed with downwardly turned lips *c* at intervals throughout its length to better enable the back plate C to be effectively interlocked with the cast metal body A of the shoe in the casting operation.

Adjacent its center, the supplemental back C is formed with projecting parts or lips 25 and at its ends with similar projecting parts or lips 26 and 27, the purpose of these lips 25, 26 and 27 being to engage and interlock with the lower portions or members of the center and end lugs, as will presently more fully appear.

In the preferred form of the invention, each of the attaching lugs at the end of the shoe (if two such lugs be employed) is formed with a main wall 30 adapted to extend transversely of the shoe from side to side thereof, as shown in Fig. 4 of the drawings, and with a central portion 31 from which rise the side walls 32 that brace against the transverse wall 30. Each of the end lugs E may be formed from a sheet metal plate or, if preferred, as a malleable casting. From the end wall 30 extend the projecting parts or members 33 provided adjacent their ends with slots 34, and from the central member 31 extends a projecting part or member 35 provided adjacent its end with a slot 36. When the supplemental back or plate C has been placed within the pan-shaped back B, the projecting part or member 35 of each end lug E will be passed through the corresponding slots 21 and 21$^a$ of the back B and supplemental back C, and the projecting parts or members 33 of each end lug will be passed through the appropriate slots 22, 23 and 22$^a$ and 23$^a$ of the back and supplemental back. The part or member 35 of the end lugs will then be bent forwardly toward the end of the shoe, as shown in Fig. 12, and the projecting part or lip 27 will be passed through the slot 36 in the part or member 35 and will be bent against the inner face of said part, as shown in Fig. 12. The projecting parts or members 33, after having been passed through slots 22, 23 and 22$^a$ and 23$^a$, will be bent rearwardly, as shown in Fig. 11, and the projecting parts or lips 26 will be passed through the slots 34 of the parts or members 33 and will be bent up against the under side of the parts 33, as clearly shown in Fig. 10 of the drawings. When the end lugs E have thus been fixed in position for use, they will be securely interlocked with the end portions of the back and supplemental back, so that all danger of their displacement is guarded against.

The center lug D, which may be formed either of plate metal or a malleable casting, (similarly to the center lug set forth in an application filed by me in the United States Patent Office, July 24, 1912, Serial No. 711,304) has a crown 40 and has sides provided with laterally projecting walls 41. This center lug is formed with depending parts or members 42 formed with slots 43 adjacent their lower ends. In placing the center lug in position for use, the parts or members 42 are first passed through the slots 20 and 20$^a$ of the back and supplemental back and are then bent outwardly, as shown in Fig. 17 of the drawings. The projecting parts or lips 25 of the supplemental back C are passed through the slots 43 of the depending parts or members 42 and bent upwardly against the faces of said parts 42, as clearly shown in Fig. 17 of the drawings. When the center lugs are thus attached in position for use, they will be securely held against the possibility of displacement and the parts will be in readiness to be attached to the body A of the shoe in the casting operation. When the back and supplemental back and the center and end lugs have been assembled, as described, these parts will be placed within the mold and the body of the shoe will be cast thereon, in manner well understood by those familiar with the manufacture of this type of brake shoe, and it will be found that the material, whereof the body of the shoe is formed, will extend about and interlock with the parts, so as to hold them together in a most effective manner.

While I have shown what I regard as the preferred embodiment of my invention, it is obvious that the details of construction can be varied without departing from the spirit of the invention and that features of the invention may be employed without its adoption as an entirety. Thus, it is not essential to certain features of my invention that there should be both a back and a supplemental back, and it is obvious also that the manner of connecting the attaching lugs to the back may be followed with advantage, regardless of the material whereof the body of the shoe is composed.

Having thus described my invention, what I claim as new, and desire to secure by Letters Patent, is:

1. A brake shoe comprising a reinforcing, perforated back provided adjacent its perforation with a projecting part and an attaching lug having a member passing through said perforated back and interlocked with said projecting part of said back.

2. A brake shoe comprising a reinforcing, perforated back provided adjacent its perforation with a projecting part and an attaching lug having a perforated member passing through said perforated back, said projecting part of said back passing through said perforated member of the lug.

3. A brake shoe comprising a reinforcing back perforated adjacent its center and provided about its center with laterally projecting parts and an attaching lug having side members passing through the perforated back and having perforated ends through which said projecting parts of the back pass.

4. A brake shoe comprising a reinforcing back perforated adjacent its center and provided about its center with laterally projecting parts, and an attaching lug having side members passing through the perforated back and having bent lower ends interlocked with said projecting parts of the back.

5. A brake shoe comprising a reinforcing back perforated adjacent its center and provided about its center with laterally projecting parts and an attaching lug having perforated side members passing through the perforated back, said side members being bent laterally and said projecting parts of the back passing through said side members of the lug and bent laterally to interlock therewith.

6. A brake shoe comprising a reinforcing back provided adjacent its end with a perforation and with a bendable, projecting part and an end attaching lug having a member passing through said perforated back and interlocked with said projecting part of said back.

7. A brake shoe comprising a reinforcing back provided adjacent its end with perforations and with bendable, projecting parts and an end attaching lug having members passing through the perforations of said back and interlocked with said projecting parts of said back.

8. A brake shoe comprising a reinforcing back provided adjacent its end with perforations and with bendable, projecting parts and an end attaching lug having a plurality of perforated members passing through said perforated back, said projecting parts of said back being passed through said perforated members of the lug.

9. A brake shoe comprising a reinforcing back provided adjacent its end with perforations and with a plurality of bendable, projecting parts and an end attaching lug having a wall adapted to extend across the back and having adjacent its ends and center members passing through said perforated back and interlocked with said projecting parts of said back.

10. A brake shoe comprising a reinforcing back provided adjacent its end with a plurality of perforations and with a plurality of bendable, projecting parts and an end attaching lug having a plurality of bendable, perforated members passing through said perforated back, said projecting parts of the back passing through the perforations of said members.

11. A brake shoe comprising a reinforcing, perforated back, a supplemental perforated back, one of said parts being provided adjacent its perforation with a projecting part and an attaching lug having a member passing through said back and supplemental back and interlocked with said projecting part.

CLIFTON D. PETTIS.

Witnesses:
GEO. P. FISHER,
KATHARINE GERLACH.